United States Patent
Akmal et al.

(10) Patent No.: US 9,984,008 B1
(45) Date of Patent: May 29, 2018

(54) USER AUTHENTICATION IN A REMOVABLE MEDIA STORAGE SYSTEM

(71) Applicant: International Business Machines Corporation, Armonk, NY (US)

(72) Inventors: Affan Akmal, Islamabad (PK); Cai Alfven, Upplands Vasby (SE); Marcus Breuer, Dalheim (DE); Bernd Freitag, Partenheim (DE); Albrecht Friess, Renningen (DE); Frank Krick, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/352,746

(22) Filed: Nov. 16, 2016

(51) Int. Cl.
*G06F 12/14* (2006.01)
*G11B 20/00* (2006.01)
*G06K 19/07* (2006.01)

(52) U.S. Cl.
CPC ...... *G06F 12/1458* (2013.01); *G06F 12/1408* (2013.01); *G06K 19/0723* (2013.01); *G11B 20/00094* (2013.01); *G06F 2212/1052* (2013.01); *G06F 2212/154* (2013.01); *G06F 2212/213* (2013.01)

(58) Field of Classification Search
None
See application file for complete search history.

(56) References Cited

U.S. PATENT DOCUMENTS

| | | | | |
|---|---|---|---|---|
| 7,719,782 B1* | 5/2010 | Bates | ......... | G11B 15/026 360/69 |
| 7,971,019 B2 | 6/2011 | Tyndall et al. | | |
| 8,577,043 B2 | 11/2013 | Bates et al. | | |
| 8,844,829 B1* | 9/2014 | Stonoha | ......... | G08B 13/2417 235/492 |
| 9,396,754 B1* | 7/2016 | Wong | ......... | G11B 20/00876 |
| 2007/0106840 A1* | 5/2007 | Estelle | ......... | G11B 15/689 711/111 |
| 2008/0243420 A1* | 10/2008 | Gokhale | ......... | G06F 3/0604 702/127 |
| 2010/0046108 A1* | 2/2010 | Anna | ......... | G11B 5/09 360/53 |
| 2010/0208380 A1* | 8/2010 | Hellman | ......... | G06F 21/80 360/60 |
| 2011/0122527 A1* | 5/2011 | Amir | ......... | G11B 15/68 360/92.1 |
| 2015/0178012 A1 | 6/2015 | Kim et al. | | |

(Continued)

FOREIGN PATENT DOCUMENTS

WO 2015167432 A1 11/2015

OTHER PUBLICATIONS

IBM; "Label Specification for IBM 3592 Cartridges when used in IBM Libraries (Revision 2.2)"; IBM Corporation, Part No. 18P8748; Feb. 2009; Tuscon, AZ; pp. 1-10.

(Continued)

*Primary Examiner* — Kevin Verbrugge
(74) *Attorney, Agent, or Firm* — Andrew Aubert

(57) ABSTRACT

An authentication mechanism for dynamic self-provisioning of a magnetic tape cartridge library by a plurality of users for community accessed data storage. Authenticating a host computer and/or users of the host computer for accessing and processing data on a magnetic tape cartridge.

20 Claims, 10 Drawing Sheets

(56) References Cited

U.S. PATENT DOCUMENTS

2015/0193173 A1  7/2015  Bates et al.

OTHER PUBLICATIONS

Prakash et al.; "Tape Cloud: Scalable and Cost Efficient Big Data Infrastructure for Cloud Computing"; 2013 IEEE Sixth International Conference on Cloud Computing, © 2013 IEEE; pp. 541-548.
Sundby, et al.; "Meeting Backup and Archive Challenge—Today and Tomorrow"; IDC, sponsored by: Fujitsu; Oct. 2013; London, UK; 17 pages.
Akmal et al., "User Authentication in a Removable Media Storage System", U.S. Appl. No. 15/850,602, filed Dec. 21, 2017.
List of IBM Patents or Patent Applications Treated as Related, filed Dec. 27, 2017, 2 pages.

* cited by examiner

| Select | Volume Serial | Logical Library | ◂ Element Address | Type | ◂ Location | ◂ Most Recent Usage | ◂ Security | ◂ Owner by User | ◂ Expiration Info |
|---|---|---|---|---|---|---|---|---|---|
| ☐ | D10010L5 | LTFS_TEST | 1027 | LTO Ulttrium-5 | Slot(F1,C1,R31,T0) | 2015-12-22 15:50:32 | | Frank | |
| ☐ | D10011L5 | LTFS_TEST | 1030 | LTO Ulttrium-5 | Slot(F3,C3,R9,T2) | | | Able | |
| ☐ | D10012L5 | LTFS_TEST | 1035 | LTO Ulttrium-5 | Slot(F3,C7,R43,T1) | | | | Scratch |
| ☐ | D10013L5 | LTFS_TEST | 1036 | LTO Ulttrium-5 | Slot(F1,C3,R19,T0) | | Encryption EKLM | Baker | 2016-10-22 16:00:00 |
| ☐ | D10014L5 | LTFS_TEST | 1033 | LTO Ulttrium-5 | Slot(F3,C3,R18,T1) | | | Charles | |
| ☐ | D10015L5 | LTFS_TEST | 1032 | LTO Ulttrium-5 | Slot(F3,C5,R36,T1) | | | David | |
| ☐ | D10016L5 | LTFS_TEST | 1029 | LTO Ulttrium-5 | Slot(F3,C3,R26,T2) | | | Able | |
| ☐ | D10017L5 | LTFS_TEST | 1034 | LTO Ulttrium-5 | Slot(F3,C3,R4,T1) | | | Eugene | |
| ☐ | D10018L5 | LTFS_TEST | 1028 | LTO Ulttrium-5 | Slot(F3,C3,R33,T2) | | | Guy | |

FIG. 7

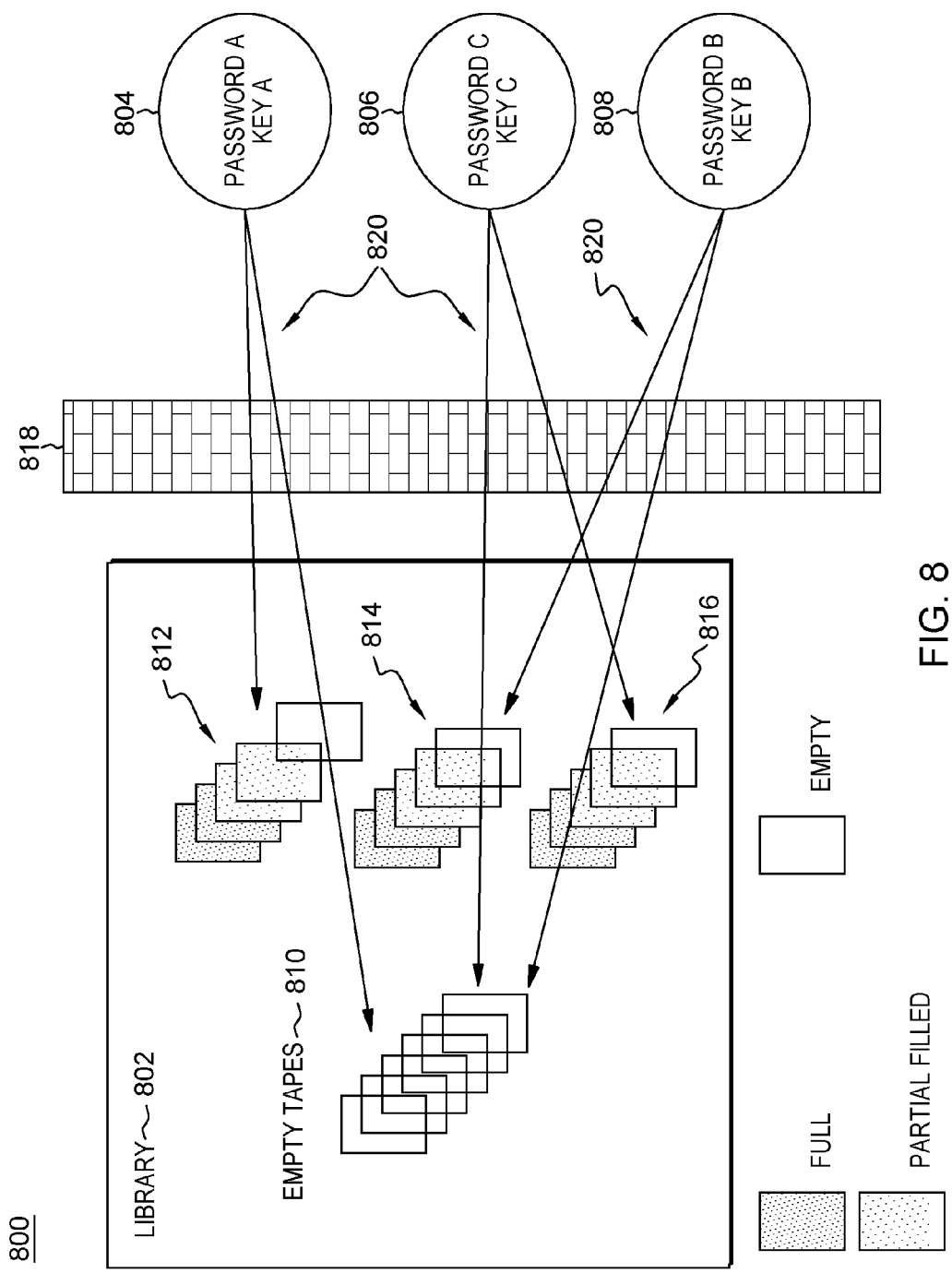

USER AUTHENTICATION IN A REMOVABLE MEDIA STORAGE SYSTEM

BACKGROUND

This application for patent relates generally to the field of storage systems, and more particularly to accessing data stored within a storage system.

A magnetic tape cartridge library, sometimes called a tape silo, a tape robot, a tape library, and a tape jukebox, is a storage device that contains: (i) one or more magnetic tape drives; (ii) a number of slots to hold magnetic tape cartridges; (iii) a barcode reader to identify each of the cartridges; and (iv) a mechanism for automatically loading a cartridge into an available drive, such as a robot arm.

It is known to provide a tape library connected to one or more host computers via a network where a magnetic drive, operating as a control access device, contains a cartridge inventory. Tape libraries commonly have the capability of optically scanning barcode labels attached to each tape cartridge, allowing the library to automatically maintain an inventory data for which cartridge is loaded where within the library. The barcode label is often part of information recorded at the beginning of the tape medium to uniquely identify the cartridge, known as the tape label. It should be noted that there are two kinds of tape labels. The first kind is a label applied to the exterior of tape cartridge or the reel. The second kind of tape label is data recorded on the tape itself. Host computers query the tape library via the recorded cartridge inventory according to barcode identification of the individual tape cartridges. When a cartridge is selected, it is loaded by the automated means into an available magnetic tape drive.

A LAN-free backup is a backup of server data to a shared, central storage device without sending the data over the local area network (LAN). It is usually achieved by using a storage area network (SAN), which is a network that provides access to consolidated, block level data storage. A process that performs backup to a dedicated, unshared storage device, such as local magnetic tape drive, does not meet the industry definition of a LAN-free backup. SANs are primarily used to enhance storage devices, such as disk arrays, magnetic tape libraries, and optical jukeboxes. The storage devices of a SAN are accessible to servers in such a way that the storage devices appear to an operating system as locally attached storage devices. A SAN typically has its own network of storage devices that are generally not accessible through the LAN by other devices.

SUMMARY

According to an aspect of the present invention, there is a method, computer program product, service, and/or system that performs the following operations: (i) authenticating access to a tape cartridge library; (ii) receiving a request for a cartridge in the tape cartridge library; (iii) determining the cartridge is an empty cartridge; (iv) recording user information on a radio frequency identification (RFID) tag in the empty cartridge to create a user-owned cartridge; (v) loading the user-owned cartridge in a drive associated with the tape cartridge library; and (vi) granting access for processing data on the user-owned cartridge.

BRIEF DESCRIPTION OF THE DRAWINGS

FIG. 7 is a screenshot view generated by the first embodiment system;

FIG. 8 is a block diagram of a second embodiment of a system according to the present invention.

DETAILED DESCRIPTION

Figure 1:
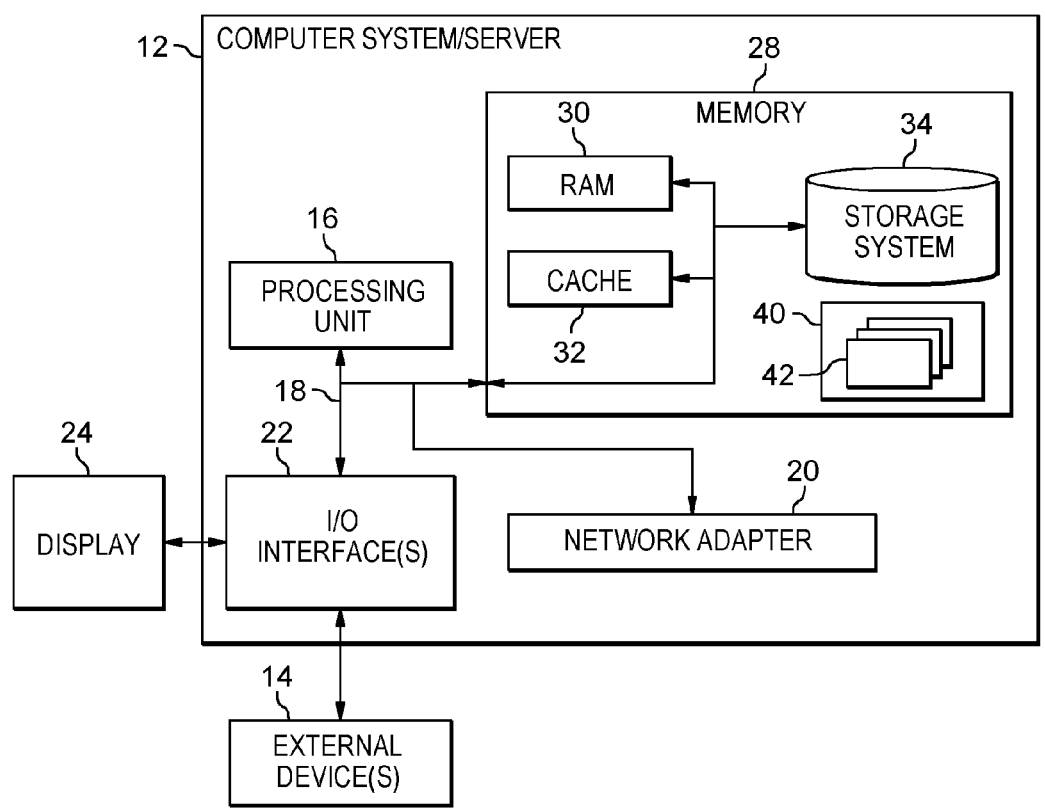
FIG. 1 depicts a cloud computing node used in a first embodiment of a system according to the present invention.

An authentication mechanism for dynamic self-provisioning of a magnetic tape cartridge library by a plurality of users for community accessed data storage. Authenticating a host computer and/or users of the host computer for accessing and processing data on a magnetic tape cartridge. This Detailed Description section is divided into the following sub-sections: (i) The Hardware and Software Environment; (ii) Example Embodiment; and (iii) Further Comments and/or Embodiments.

I. The Hardware and Software Environment

The present invention may be a system, a method, a service, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
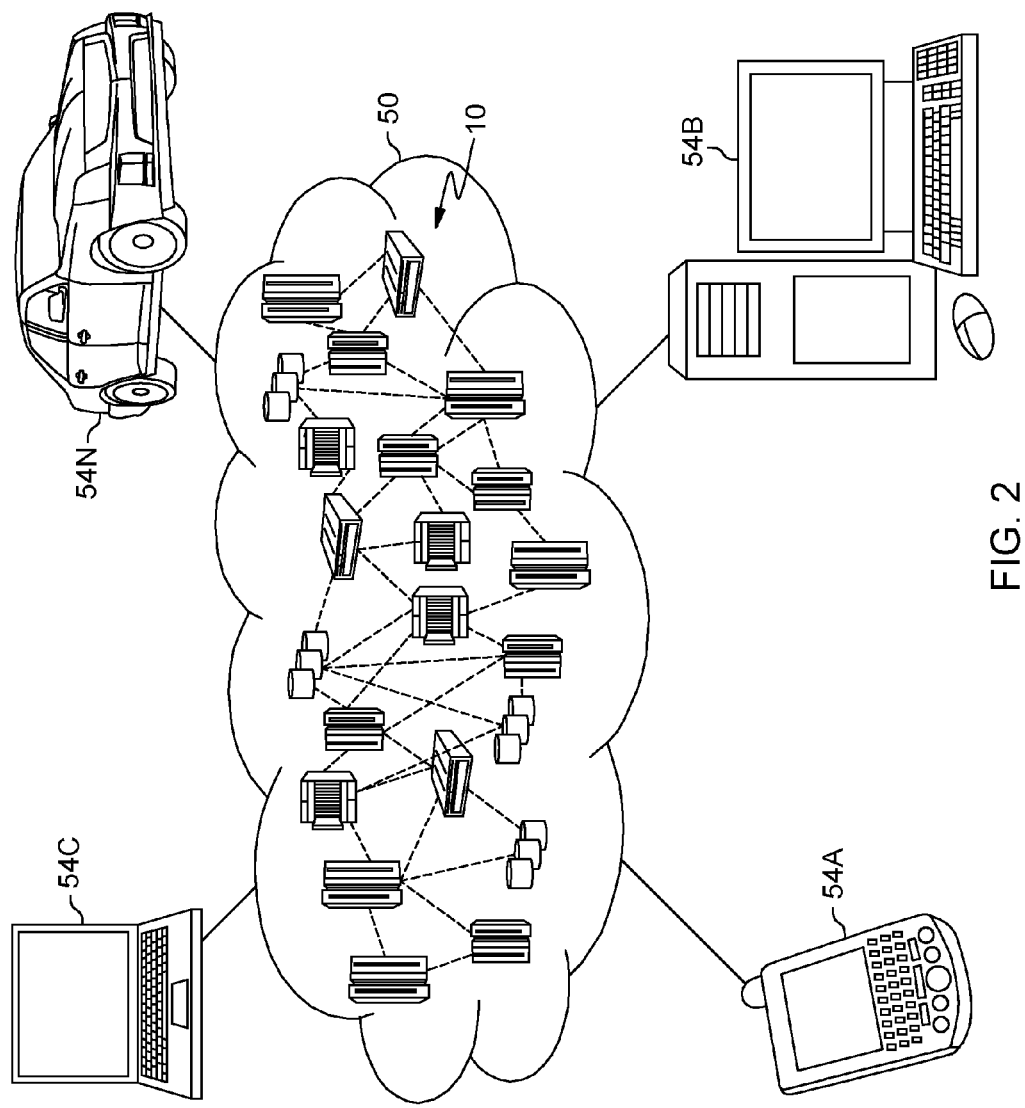
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Still yet, any of the components of the present invention could be deployed, managed, serviced, etc. by a service provider who manages a magnetic tape cartridge library.

Figure 3:
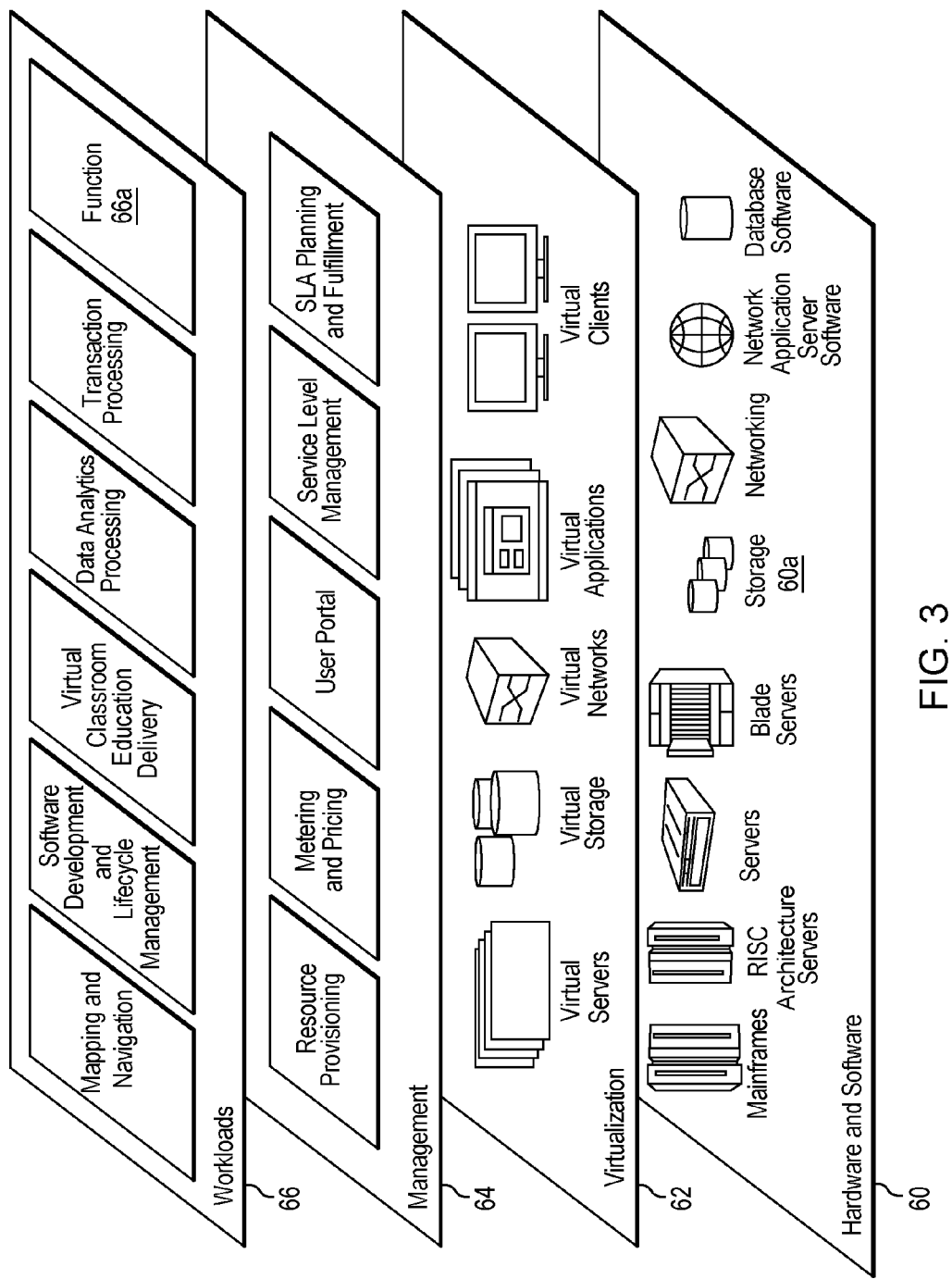
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

It is known to assign logical magnetic tape libraries to dedicated hosts or to a dedicated group of hosts in a storage area network (SAN). To practice this process, it is required that the physical magnetic tape library includes: (i) multiple magnetic tape drives; (ii) multiple magnetic tape cartridges, each cartridge having a barcode label as a unique identifier, and each cartridge being inserted into magnetic tape cartridge storage slots ready for use.

Some magnetic tapes, including Linear Tape-Open (LTO) and Advanced Intelligent Tape (AIT), use RFID tags as a form of tape label. (Note: the term(s) "LTO" and/or "AIT" may be subject to trademark rights in various jurisdictions throughout the world and are used here only in reference to the products or services properly denominated by the marks to the extent that such trademark rights may exist.) RFID tags include tape metadata such as data locations, the number of tape errors encountered, and the number of times the entire tape was read or written.

There is a business trend to provide IT as a service for small and medium businesses. In such services, the clients can rent IT equipment or cloud storage. With the described problems, providing backup environment with magnetic tape libraries to a high amount of users in a cloud is very hard to manage. Therefore, a practical issue may arise when providing restricted access to magnetic tape cartridges in a physical magnetic tape library between the users of, for example, more than 2000 host partitions with more than 1000 different users each. To solve this problem with prior art magnetic tape library technology multiple large libraries fully equipped with magnetic tape drives must be used what makes the currently available solution inefficient and expensive.

Figure 4:
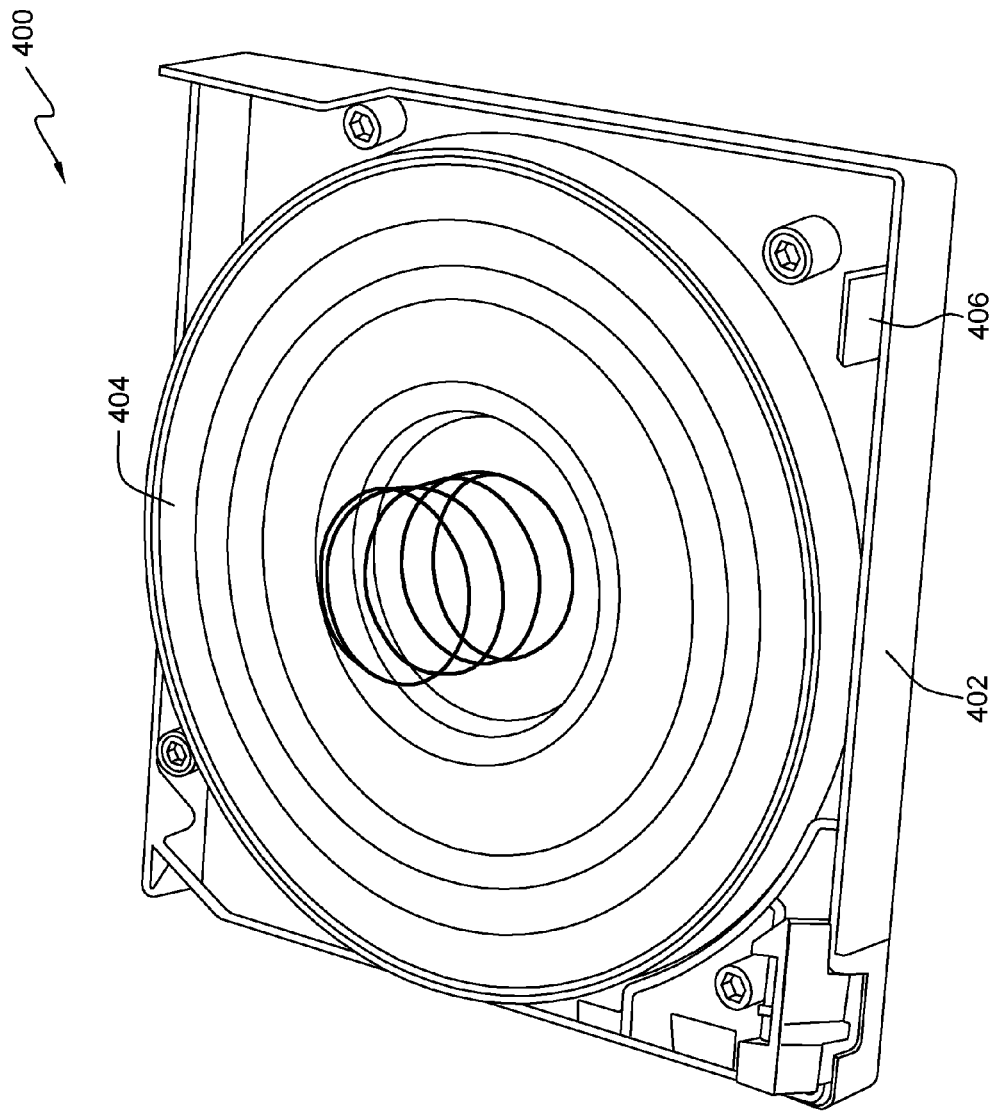
FIG. 4 is a perspective view of an example magnetic tape cartridge according to some embodiments of the present invention.

FIG. 4 depicts conventional magnetic tape cartridge 400 and several components of the cartridge including: housing shell 402; magnetic tape wheel 404; and cartridge memory radio frequency identification (RFID) chip 406. Certain information is stored on the RFID chip, which can be manipulated and read by each magnetic tape drive of a tape library.

Figure 5:
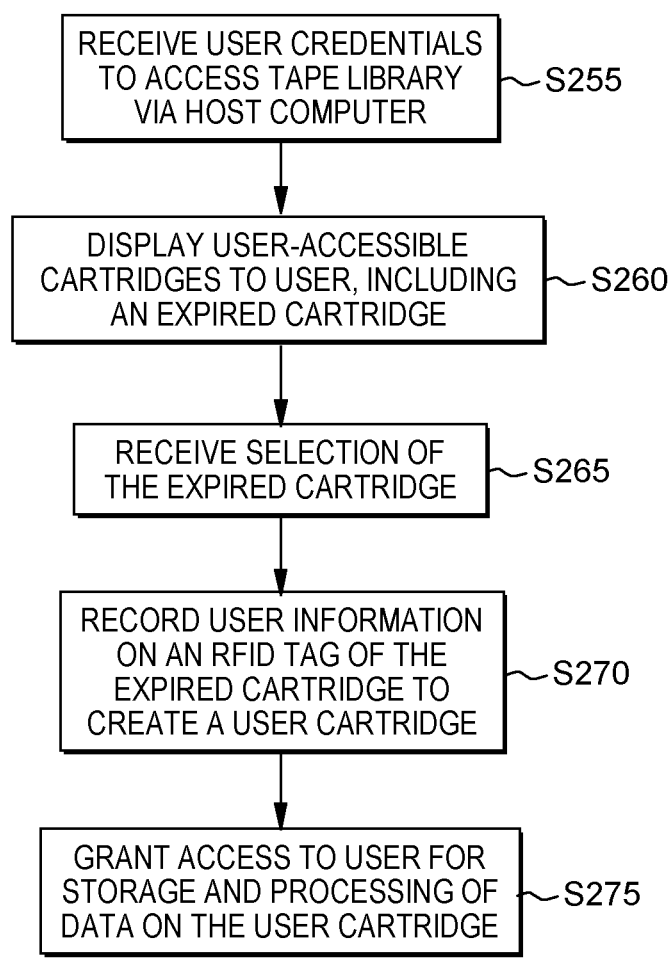
FIG. 5 is a flowchart showing a first embodiment method performed, at least in part, by the first embodiment system.
Figure 6:
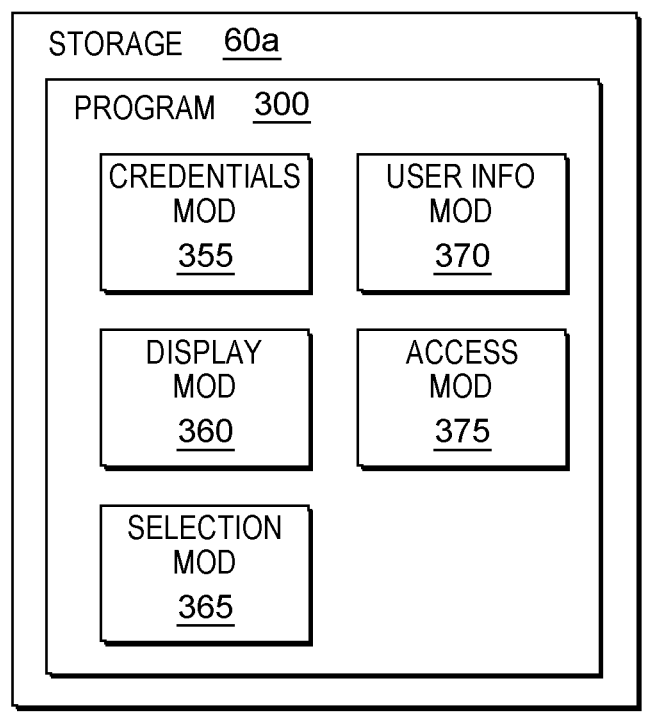
FIG. 6 is a block diagram showing a machine logic (for example, software) portion of the first embodiment system.

FIG. 5 shows flowchart 250 depicting a method according to the present invention. FIG. 6 shows program 300 for performing at least some of the method operations of flowchart 250. This method and associated software will now be discussed, over the course of the following paragraphs, with extensive reference to FIG. 5 (for the method operation blocks) and FIG. 6 (for the software blocks). One physical location where program 300 of FIG. 6 may be stored is in storage block 60a (see FIG. 3).

Processing begins at operation S255, where credentials module ("mod") 355 receives user credentials to access a tape library via a host computer. In this example, the host computer, such as desktop 54B in FIG. 2, is accessible to multiple users. Each user is assigned user-specific credentials including a username and password. Alternatively, a single host computer, such as smartphone 54A, is assigned host-specific credentials for accessing the tape library, which may be a single string, such as a MAC (media access control) address. In some embodiments of the present invention, the host computer communicates over a wireless network to access the tape library Regardless of the entity identified by the received credentials, credentials mod 355 receives the credentials and may operate to grant or deny access to the tape library according to the received credentials. In some embodiments of the present invention, the credentials mod operates as an intermediary to negotiate access with a corresponding tape library controller.

Processing proceeds to operation S260, where display mod 360 displays user-accessible cartridges to the user, including an expired cartridge available for use by the user. Continuing with this example, the user-specific credentials are received and access is granted to the user for access to the tape library. However, the user is able only to access user-accessible cartridges according to pre-determined access privileges corresponding to the user-specific credentials. Some embodiments of the present invention store ownership data on an RFID tag in each tape cartridge. That is to say, the pre-determined access privilege is based on a correspondence between the user-provided credentials and the ownership data stored on each cartridge. Having matched the credentials with certain owned cartridges, the matching cartridges, referred to as user-accessible cartridges, are displayed via a user interface to the user for selection. Also, any expired cartridges that are generally available are displayed to the user. Alternatively, the credentials associated with the host computer correspond to certain in-use cartridges and expired cartridges. Alternatively, user-accessible cartridges includes a limited number of expired cartridges according to a user-agreement.

Processing proceeds to operation S265, where selection module 365 receives selection of the expired cartridge. The user is able to select user-accessible cartridges from the displayed cartridges via the user-interface. In this example, the user selects an expired cartridge that is displayed to the user as being accessible to the user. Alternatively, the user selects a cartridge containing user data assigned specifically to the user. User data is not shared with other users unless certain credentials being presented to the credentials mod. When a cartridge having user data is being accessed, the user is granted access to store and/or process user data on the cartridge.

Processing proceeds to operation S270, where user information mod 370 records user information on an RFID tag of the expired cartridge to create a user cartridge, this cartridge may also be referred to as a user-owned cartridge. In this example, the user selects an expired cartridge for use. Processing proceeds to associate the user with the cartridge by recording user information on the RFID tag of the selected expired cartridge. By recording the user information on the RFID tag, the cartridge is recognized as a user cartridge and it no longer displayed generally as an expired cartridge. User information is discussed in more detail below as tape-specific ownership data in the Further Comments and/or Embodiments sub-section. Briefly, user information includes identifying information for use in displaying to the user those cartridges that belong to the particular user. For example, user information may include: (i) user-name; (ii) owner name; (iii) application name; (iv) storage pool; (v) expiration status; (vi) encryption type; and/or (vii) encryption software.

Processing ends at operation S275, where access mod 375 grants access to the user for storage and processing of user data on the user cartridge. It should be noted that some embodiments of the present invention are device-centric such that a particular host computer is authorized to access certain cartridges having host information stored on the RFID instead of user information. In such cases, the cartridge is properly referred to as the host cartridge and anyone operating via the host computer is able to store and process host data on the host cartridge.

In another embodiment, the invention provides a business method that performs the process steps of the invention on a subscription, advertising, and/or fee basis. That is, a service provider, such as a Solution Integrator, could offer magnetic tape storage options for a user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

III. Further Comments and/or Embodiments

Conventionally, a user/application of a host computer queries a magnetic tape cartridge inventory of an attached magnetic tape library. The tape library controller queries the barcode ID's of the magnetic tapes available in this library. Then, the tape library controller provides the list of barcode ID's found in this magnetic tape library to the attached host computer. The user/application of the attached host computer then can load any magnetic tape cartridge into an empty magnetic tape drive, if available. The user/application can then process data on this loaded magnetic tape drive. The efficiencies gained by application of some embodiments of the present invention should be apparent to one skilled in the art upon review of this Detailed Description section.

Some embodiments of the present invention recognize the following facts, potential problems and/or potential areas for improvement with respect to the current state of the art: (i) the magnetic tape cartridges of a magnetic tape library can be accessed by any host computer and user that is connected; (ii) the data stored on magnetic tape cartridges can be read and written by any user or application that can access the library; (iii) for large backup environments, data on magnetic tape cartridges may be deleted because of incorrect network zoning and/or incorrect configuration allowing a host computer to operate on the wrong magnetic tape cartridge causing data overwrite and deletion of data; (iv) manual configuration of very large magnetic tape libraries and their manual configuration at the host computer require manual intervention for reconfiguration where additional tape drives and/or cartridge resources are needed; (v) the limitation in the amount of magnetic tape drives in a magnetic tape library (where a large magnetic tape library is configured into smaller logical libraries); (vi) magnetic tape storage is the most cost efficient type of storage and the fact that a magnetic tape drive can provide a read/write performance of more than 350 MB/sec makes it usable for cloud users; (vii) does not require management of multiple logical tape libraries; (viii) even tape libraries having 192 tape drives are inherently limited to 192 logical libraries; and/or (ix) cartridge memory encryption takes place in the tape library controller to associate tape cartridges to a particular user, application, and/or logical library and, as such, encryption is limited to a single encryption key manager system.

In some embodiments of the present invention, the magnetic tape cartridge ownership information is stored onto the cartridge memory chip of a user-owned magnetic tape cartridge via the magnetic tape drive in use. FIG. 7 depicts screenshot 700 showing certain exemplary ownership information fields according to some embodiments of the present invention. Ownership information fields include: security 705; owned by user 702; and expiration information 704. In the case where an application queries the inventory of a magnetic tape library shown by volume serial numbers 703, the ownership information is used to filter magnetic tape cartridges by owner information. For example, when owner Frank 706 enters a read element status command, Frank is only able to view volumes DI0010L5 and DI0012L5, which is an expired cartridge viewable by all users. Further, owner Guy 708 would be only able to view volumes DI0018L5 and the expired cartridge DI0012L5 in response to a read element status command. Any unowned magnetic tape cartridge at the first time it is accessed, it receives ownership information for the accessing owner. The ownership information automatically is removed if the host backup application moves the magnetic tape cartridge barcode into the scratch.

The ownership information allows then the magnetic tape library controller to query all the magnetic tape cartridges listed in the scratch pool and to select the magnetic tape cartridges with available ownership assignment. To remove the ownership information of the cartridges belonging to a scratch pool the controller mounts the expired cartridge into a magnetic tape drive and removes the ownership information. This frees up this magnetic tape cartridge to be reused by other hosts or users.

One example use of the present invention is to offer a smartphone user an option to store photographic images on a magnetic tape drive operable through a cloud environment. The user-owned cartridges are made available for access through the user's smartphone. An advantage to this example use over conventional practice is that photographs are note well suited for compression.

Referring now to FIG. 8, system 800 is shown with users 804, 806, and 808. Each user has a corresponding unique password and encryption key, distinguished by the suffix A, B, and C. The library controller 818 is represented as a wall that communication paths 820 must pass through to reach tape library 802. The library controller only permits user 804 to access tapes 812 and 810, which are empty and available to each of the three users. Similarly, user 806 may only access tapes 816 and 810 and user 808 may only access tapes 814 and 810.

Some embodiments of the present invention query information recorded on a magnetic tape drive including: (i) unique worldwide node name of the host's connecting fiber channel port connected to this magnetic tape drive; and (ii) qualified hostname of the host connecting via SAN network to this magnetic tape drive.

Some embodiments of the present invention store tape-specific ownership data on the cartridge memory RFID chip, which may be modified by the magnetic tape drive any time before unloading the magnetic tape cartridge from the magnetic tape drive. An example command follows for querying the tape-specific ownership data on the RFID chip.

"Application Specific Page"
Read CM Attribute:
  itdt -f/dev/XYZtape1 readattr 0x802 -d attr802.data
Write CM Attribute:
  itdt -f/dev/XYZtape1 writeattr 0x802 -s attr802.data The tape-specific ownership data may include: (i) username; (ii) owner; (iii) application name; (iv) storage pool; (v) expiration status; and/or (vi) security information. Accordingly, each magnetic tape cartridge provides a response to a read element status command. The specified owner can see those cartridges on which owned information is stored. Further, as stated earlier, each host, or user, can see those cartridges that are expired and, therefore, available for reuse.

Some embodiments of the present invention provide for the use of all magnetic tape drives in a tape library by any user because it is a LAN-free setup where all hosts attached to a given tape library can see all the magnetic tape drives. The use of the tape cartridges in the magnetic tape library has a first option of manual cartridge-user assignment by an administrator, and a second option of automatically managing the user-assignment to a cartridge based on the expiration information stored in the RFID chip.

According to some embodiments of the present invention, the authentication and/or ownership information of a magnetic tape cartridge allows each user or host computer to grow their library dynamically according to use. This introduces a minimum security level as another user cannot access the same cartridge without login credentials of the user. That is, authenticated access is provided to a user for accessing only a portion of the tape cartridges within the tape cartridge library according to pre-determined access rights granted to particular authenticating credentials.

Some embodiments of the present invention store security information on the RFID chip of the tape cartridge. In that way, the type of encryption method and/or software used to encrypt the data on the tape is automatically selected as additional security tier.

Some embodiments of the present invention store expiration and storage pool information on the RFID chip of the tape cartridge. In that way, the library controller may automatically assign an expired cartridge for use by another user.

Functional considerations for implementation of some embodiments of the present invention include whether a tape library is managed by an administrator. Where there is an administrator, maximum flexibility is provided, cost/capacity balance is managed, and thin provisioning is available. Where there is no administrator, the capacity limit is fixed, and there are tiered users. Additionally, each user or host should have visibility/access to tapes owned and to empty tapes available for use. Accordingly, there should be a username and login required to access the server, a password may be implemented for visibility of certain tape cartridges, and an encryption key should specify the encryption method and key of the owned cartridges.

Some embodiments of the present invention are directed to a method for dynamic self-provisioning of a tape library by a plurality of users for data storage, where the tape library includes (i) a plurality of tape drives and tape cartridges, and (ii) an inventory for storing tape cartridge information. The tape library (i) communicates to a plurality of applications for storing data, (ii) establishes communication for mounting tape cartridges, and (iii) queries inventory of tape library. The tape library is extended by an authentication component that includes (i) querying inventory of the tape library for free tape drives and tape cartridges resulting in a list of free, or already assigned (user-owned), tape cartridges and free tape drives available to the requesting user, (ii) selecting free tape drive and tape cartridge by the requesting user, (iii) sending a tape cartridge mount request by the requesting user from a geographically remote device to the tape library (controller) (the mount request includes at least the selected tape cartridge ID, the selected tape drive ID, and authentication information provided by the user), and (iv) executing the tape cartridge mount request by the tape library (controller). The method may further include: starting authentication of the requesting user to the requested tape cartridge either before or after executing tape cartridge mount request by using the authentication component, where the authentication comprises the steps of: (a) reading authentication information included in the request, (b) reading authentication information included in the tape cartridge memory, (c) comparing both authentication information, if authentication successful allowing processing of read or write operations onto the tape cartridge, and (d) storing User ID in the tape cartridge memory and updating the inventory by assigning the user ID to the tape cartridge ID for previously unassigned tape cartridges.

Additionally, in some embodiments, the request includes further security communication information; the request includes further cartridge expiration information; and/or the authentication component is part of the tape library controller.

Figure 9A:
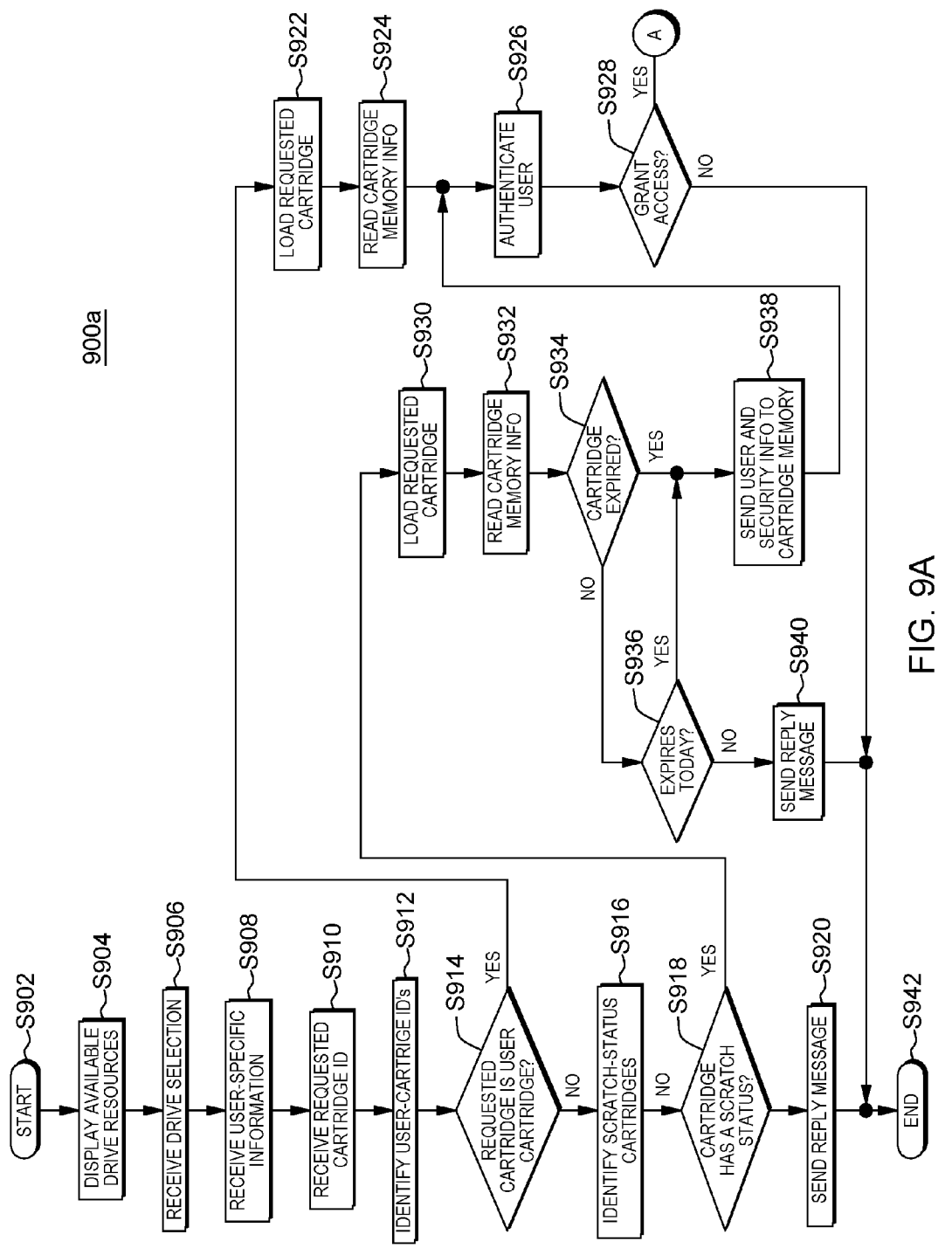
FIGS. 9A and 9B are a flowchart showing a second embodiment method performed, at least in part, by the second embodiment system.
Figure 9B:
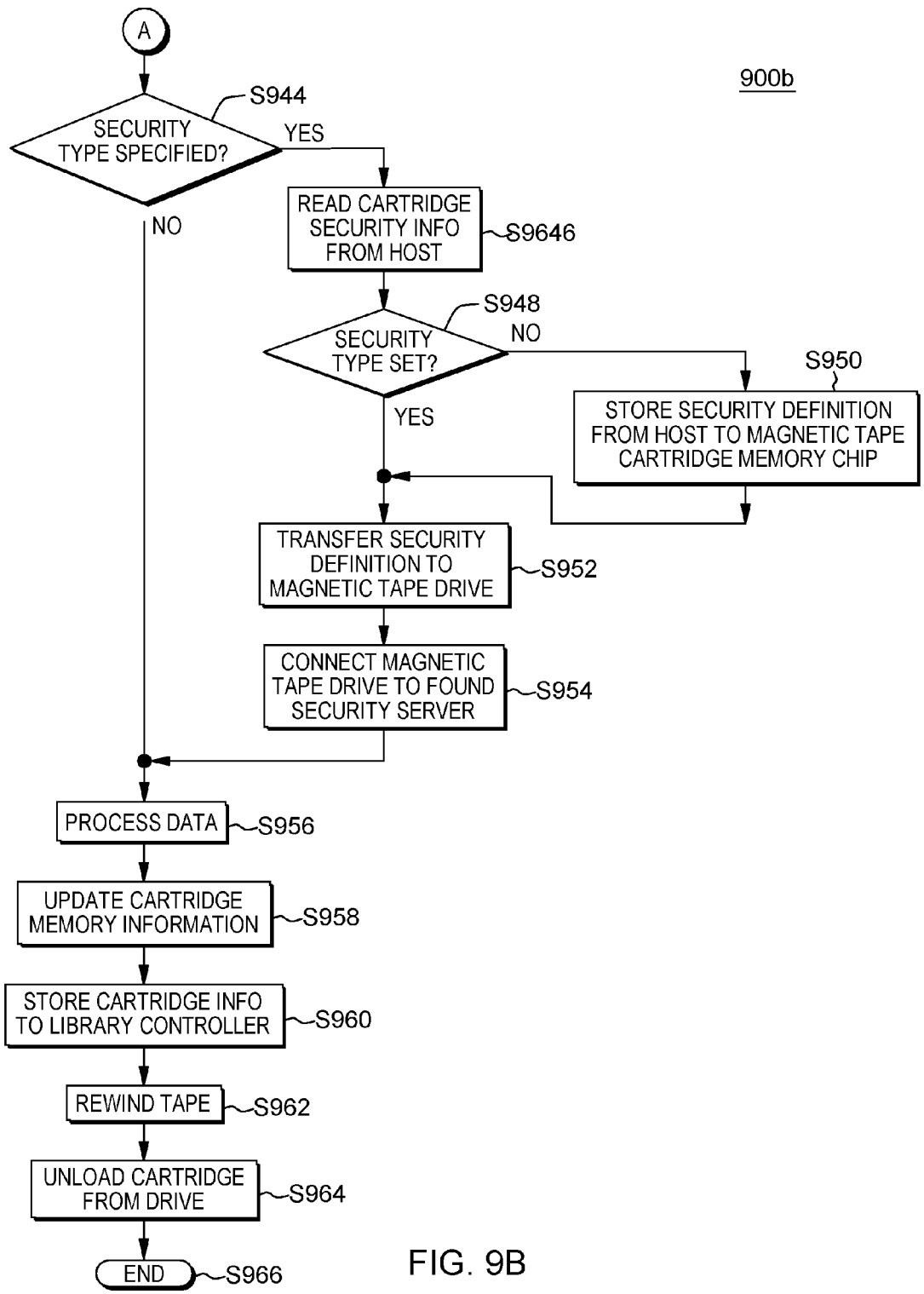

FIGS. 9A and 9B illustrate processes 900a and 900b for magnetic tape cartridge authentication and configuration to allow secure and dynamic self-management via the magnetic tape drive according to some embodiments of the present invention. This particular embodiment is draws from conventional LAN-free backup environments. That is, all attached computer hosts have all magnetic tape drives of a magnetic tape library configured.

Processing begins at step S902 and proceeds to step S904, where available drive resources are displayed. In this example, an available drive resource is a free drive for mounting cartridges within a particular physical tape library.

Processing proceeds to step S906, where an available drive resource is selected.

Processing proceeds to step S908, where the requesting host computer provides user-specific information. In this example, the user-specific information includes username, password, and encryption preference.

Processing proceeds to step S910, where a cartridge identification (ID) is provided via a host mount request.

Processing proceeds to step S912, where user-cartridge ID's within the library are identified.

Processing proceeds to step S914, where it is determined whether or not the requested cartridge is a user cartridge. In this example, a user cartridge is one that contains user data and is set up according to embodiments of the present invention for authentication and self-selection. If the requested cartridge is a user cartridge, processing proceeds down the "yes" branch, where authentication is confirmed and access is granted. If the requested cartridge is not a user cartridge, processing proceeds down the "no" branch, where further processing leads to a grant or denial of access to the requested cartridge.

Following the "no" branch, processing proceeds to step S916, where scratch-status cartridges are identified within the tape library.

Processing proceeds to step S918, where it is determined whether or not the requested cartridge has a scratch status. If the requested cartridge has a scratch status, processing proceeds down the "yes" branch, where processing of the scratch status cartridge is performed. If the requested cartridge does not have a scratch status, processing proceeds down the "no" branch, where the requesting host is notified of the unfavorable determination.

Following the "no" branch, processing proceeds to step S920, where a reply message is returned to the requesting host computer stating that the requested magnetic tape cartridge is not available. Processing then ends at step S942.

Returning to the "yes" branch following step S914, processing proceeds to step S922, where the requested cartridge is loaded into the selected drive resource.

Processing proceeds to step S924, where the authentication system reads the cartridge memory information stored on the cartridge RFID tag.

Processing proceeds to step S926, where the accessing user is authenticated. As discussed earlier, the host computer itself may be the basis for authentication; however, in this example, the user operating via the host computer is required to authenticate for access to the user-cartridge.

Processing proceeds to step S928, where a decision is made whether to grant or deny access to the user cartridge. If the decision is made to grant access, that is, if the user is authenticated as an owner of the user cartridge, then processing proceeds down the "yes" branch. If the decision is made to deny access, then processing proceeds down the "no" branch. Processing then ends at step S942.

Returning to the "yes" branch following step S918, processing proceeds to step S930, where the requested cartridge is loaded into the selected drive resource.

Processing proceeds to step S932, where the authentication system reads the cartridge memory information stored on the cartridge RFID tag.

Processing proceeds to step S934, where it is determined whether or not the requested cartridge has expired. If the requested cartridge has expired, processing proceeds down the "yes" branch, where the requested cartridge is set up for use by the requester. If the requested cartridge has not expired, processing proceeds down the "no" branch, where additional inquiry occurs.

Following the "no" branch, processing proceeds to step S936, where it is determined whether or not the requested cartridge expires on the day of the request, or today. If the requested cartridge expires the same day as receipt of the request, processing proceeds down the "yes" branch. If the requested cartridge does not expire on the same day as receipt of the request, processing down the "no" branch, where the requesting host is notified of the unfavorable determination.

Following the "no" branch, processing proceeds to step S940, where a reply message is returned to the requesting host computer stating that the requested magnetic tape cartridge has not expired. Processing then ends at step S942.

Returning to the "yes" branch following either of steps S934 and S936, processing proceeds to step S938, where user info is recorded in the RFID tag of the requested cartridge. User info includes, in this example, username, expiration date, and encryption preference.

Processing proceeds to step S926, discussed above where the user is authenticated and then, at step S928, access is either granted or denied.

Following the "yes" branch from step S928, processing is shown at FIG. 9B as proceeding to step S944, where it is determined whether or not a security type is specified for the requested cartridge. If a security type is specified, processing proceeds down the "yes" branch, where security definitions are considered. If a security type is not specified, processing proceeds down the "no" branch, where data processing is made available to the requester.

Following the "yes" branch, processing proceeds to step S946, where cartridge security information is obtained from the requesting host computer. Security information may include encryption method and/or encryption software used to encrypt the user data stored on the user cartridge.

Processing proceeds to step S948, where a determination is made as to whether the identified security type is set, or established, for requested cartridge. If the security type is set, processing proceeds down the "yes" branch, where security-related processing occurs. If the security type is not set, processing proceeds down the "no" branch, where the security type is associated with the requested cartridge.

Following the "no" branch, processing proceeds to step S950, where the security definition obtained from the requesting host computer is stored to the memory chip, or RFID tag, of the requested cartridge.

Processing proceeds, whether from the "yes" branch of step S948 or from step S950, to step S952, where the security definition obtained in step S946 is transferred to the selected drive resource.

Processing proceeds to step S954, where the selected tape drive is connected to a found security server according to the provided security definition.

Processing proceeds, whether from the "no" branch of step S944 or from step S954, to step S956, where the requesting user is provided access to process the user data stored on the requested magnetic tape cartridge.

Processing proceeds to step S958, where, responsive to data processing activity in step S944, the cartridge memory information is updated.

Processing proceeds to step S960, where cartridge information is stored to the library controller. Cartridge information includes user information, expiration information, and/or security information.

Processing proceeds to step S962, where the requested tape is rewound.

Processing proceeds to step S964, where the requested cartridge is unloaded from the selected drive. Processing then ends at step S966.

Some embodiments of the present invention are directed to a method for providing a tape library to a plurality of users for data storage, wherein said tape library includes a plurality of tape drives and a plurality of tape cartridges, wherein each tape drive communicates via first network to a plurality of applications for storing data and establishes communication to tape library controller via a second network for mounting tape cartridges, querying inventory of tape library, wherein each tap drive is extended by authentication component, wherein said method comprising the steps of: (i) querying inventory of said tape library for free tape drive and tape cartridges resulting a list free tape cartridges and tape drives; (ii) sending a tape cartridge mount request via first network to the selected tape drive and selected tape cartridge from said list, wherein said mount request includes authentication information; (iii) transferring said tape cartridge mount request via second network to said tape library controller and currently updating said inventory of tape library to prevent access said selected tape drive and said tape cartridge; (iv) initiating mounting of said selected tape cartridge and said selected tape drive by said tape library controller; (v) if mounting finished, starting authentication of said requesting application to said requested tape cartridge by said using said authentication component and said authentication information included in said request; and (vi) if authentication successful, processing read or write operation as requested by said application.

Some embodiments of the present invention may include one, or more, of the following features, characteristics and/or advantages: (i) clients can rent IT equipment and cloud storage; (ii) cost efficient and larger storage to match the growth of private data; (iii) self-management of access to magnetic tape cartridge data between different groups of host computers; (iv) a host system, user, or user group can only see the owned magnetic tape cartridge inventory, but can use any of the attached tape drives within this shared magnetic tape library for storage; (v) facilitates implementation of shared magnetic tape libraries to multiple host systems and virtualized server instances in very large storage cloud environments; (vi) allows cloud users to self-configure their magnetic tape storage library; (vii) a user can select and use empty cartridges for storage; (viii) uses user information and security information stored in the cartridge memory as a high security secured-user/client-level authentication of removable media storage system in a cloud environment; (ix) a host system, user or user group can use any of the attached tape drives within a shared magnetic tape library; (x) cartridge memory is used to provide information of which encryption system is used for the cartridge; (xi) each cartridge within the tape library can use a different encryption system to ensure data security; (xii) a user or a backup client can self-define the needed amount of tape cartridges within a cloud environment; (xiii) a user or a backup client can self-manage secure access to any owned magnetic tape cartridges; (xiv) operates independent of tape library hardware limitations or installed physical tape drives (control path drives); and/or (xv) within a cloud environment thousands of virtual machines with different kinds of backup/archive applications such as LTFS Library Edition can access a physical tape library in parallel.

What is claimed is:

1. A computer-implemented method comprising:
   authenticating access to a tape cartridge library;
   receiving a request for a cartridge in the tape cartridge library;
   determining the cartridge is an empty cartridge;
   recording user information on a radio frequency identification (RFID) tag in the empty cartridge to create a user-owned cartridge;
   loading the user-owned cartridge in a drive associated with the tape cartridge library; and
   granting access for processing data on the user-owned cartridge.

2. The computer-implemented method of claim 1, further comprising:
   displaying, on a user-interface, available drives in the tape cartridge library;
   receiving a drive selection through the user-interface; and
   determining a set of user-owned cartridges and empty cartridges in the tape cartridge library.

3. The computer-implemented method of claim 1, wherein the user information includes a password, a username, and a security preference.

4. The computer-implemented method of claim 3, wherein the security preference includes encryption software to be used for data encryption on the user-owned cartridge.

5. The computer-implemented method of claim 1, wherein the request for the cartridge is received from a geographically remote device.

6. The computer-implemented method of claim 1, wherein:
   the tape cartridge library is accessible to a plurality of users; and
   authenticated access is available individually to a plurality of users according to respectively corresponding credentials.

7. The computer-implemented method of claim 6, wherein only a portion of tape cartridges in the tape cartridge library is accessible by authenticated access based on credentials corresponding to a user of the plurality of users.

8. A computer program product comprising a computer-readable storage medium having a set of instructions stored therein which, when executed by a processor, causes the processor to control access to a tape cartridge library by:
   authenticating access to a tape cartridge library;
   receiving a request for a cartridge in the tape cartridge library;
   determining the cartridge is an empty cartridge;
   recording user information on a radio frequency identification (RFID) tag in the empty cartridge to create a user-owned cartridge;
   loading the user-owned cartridge in a drive associated with the tape cartridge library; and
   granting access for processing data on the user-owned cartridge.

9. The computer program product of claim 8, wherein the program instructions further cause the processor to control access to a tape cartridge library by:
   displaying, on a user-interface, available drives in the tape cartridge library;
   receiving a drive selection through the user-interface; and
   determining a set of user-owned cartridges and empty cartridges in the tape cartridge library.

10. The computer program product of claim 9, wherein the user information includes a password, a username, and a security preference.

11. The computer program product of claim 10, wherein the security preference includes encryption software to be used for data encryption on the user-owned cartridge.

12. The computer program product of claim 9, wherein the request for the cartridge is received from a geographically remote device.

13. The computer program product of claim 9, wherein:
   the tape cartridge library is accessible to a plurality of users; and
   authenticated access is available individually to a plurality of users according to respectively corresponding credentials.

14. The computer program product of claim 13, wherein only a portion of tape cartridges in the tape cartridge library is accessible by authenticated access based on credentials corresponding to a user of the plurality of users.

15. A computer system comprising:
   a processor set; and
   a computer readable storage medium;
   wherein:
   the processor set is structured, located, connected, and/or programmed to run program instructions stored on the computer readable storage medium; and
   the program instructions which, when executed by the processor set, cause the processor set to control access to a tape cartridge library by:
      authenticating access to a tape cartridge library;
      receiving a request for a cartridge in the tape cartridge library;
      determining the cartridge is an empty cartridge;
      recording user information on a radio frequency identification (RFID) tag in the empty cartridge to create a user-owned cartridge;
      loading the user-owned cartridge in a drive associated with the tape cartridge library; and
      granting access for processing data on the user-owned cartridge.

16. The computer system of claim 15, wherein the program instructions further cause the processor to control access to a tape cartridge library by:
   displaying, on a user-interface, available drives in the tape cartridge library;
   receiving a drive selection through the user-interface; and
   determining a set of user-owned cartridges and empty cartridges in the tape cartridge library.

17. The computer system of claim 15, wherein the user information includes a password, a username, and a security preference.

18. The computer system of claim 17, wherein the security preference includes encryption software to be used for data encryption on the user-owned cartridge.

19. The computer system of claim 15, wherein the request for the cartridge is received from a geographically remote device.

20. The computer system of claim 15, wherein:
   the tape cartridge library is accessible to a plurality of users; and authenticated access is available individually to a plurality of users according to respectively corresponding credentials.

\* \* \* \* \*